United States Patent

Saito et al.

(10) Patent No.: US 6,510,187 B2
(45) Date of Patent: Jan. 21, 2003

(54) MOBILE RADIO TERMINAL AND AUTOMATIC FREQUENCY CONTROL CIRCUIT

(75) Inventors: Naritoshi Saito, Hino (JP); Yutaka Asanuma, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 135 days.

(21) Appl. No.: 09/793,593

(22) Filed: Feb. 27, 2001

(65) Prior Publication Data

US 2002/0025012 A1 Feb. 28, 2002

(30) Foreign Application Priority Data

Aug. 30, 2000 (JP) ........................................ 2000-261294

(51) Int. Cl.[7] ................................................ H04L 27/06
(52) U.S. Cl. .................... 375/344; 375/147; 455/234.1; 370/342
(58) Field of Search ................................. 375/345, 130, 375/147, 368; 455/234.1; 370/335, 342

(56) References Cited

U.S. PATENT DOCUMENTS 6,278,725 B1 * 8/2001 Rouphael et al. ........... 375/148

* cited by examiner

Primary Examiner—Temesghen Ghebretinsae
(74) Attorney, Agent, or Firm—Oblon, Spivak, McClelland, Maier & Neustadt, P.C.

(57) ABSTRACT

A multiplier multiplies a baseband signal with a scramble code generated by a CPICH scramble code generator and an integrator integrates the result of the multiplication. A symbol selection control unit controls the integrator such that the integrator integrates each of two successive slots in which combinations of the symbols transmitted from two antennas of a base station are the same, in accordance with the information about the synchronous positions of the slots and frames. The result of the integration is delayed by a 1-symbol delay unit and then a code of a complex component is inverted by a complex conjugate unit. A multiplier multiplies the outputs of the integrator and complex conjugate unit, which are shaped in a complex number, to obtain an amount of phase rotation between the successive symbols, i.e. a frequency error.

8 Claims, 8 Drawing Sheets

MOBILE RADIO TERMINAL AND AUTOMATIC FREQUENCY CONTROL CIRCUIT

CROSS-REFERENCE TO RELATED APPLICATIONS

This application is based upon and claims the benefit of priority from the prior Japanese Patent Application No. 2000-261294, filed Aug. 30, 2000, the entire contents of which are incorporated herein by reference.

BACKGROUND OF THE INVENTION

1. Field of the Invention

The present invention relates to a mobile radio terminal and automatic frequency control circuit for use in a mobile telephone terminal, portable telephone system or wireless LAN system using the CDMA scheme.

2. Description of the Related Art

Figure 1:
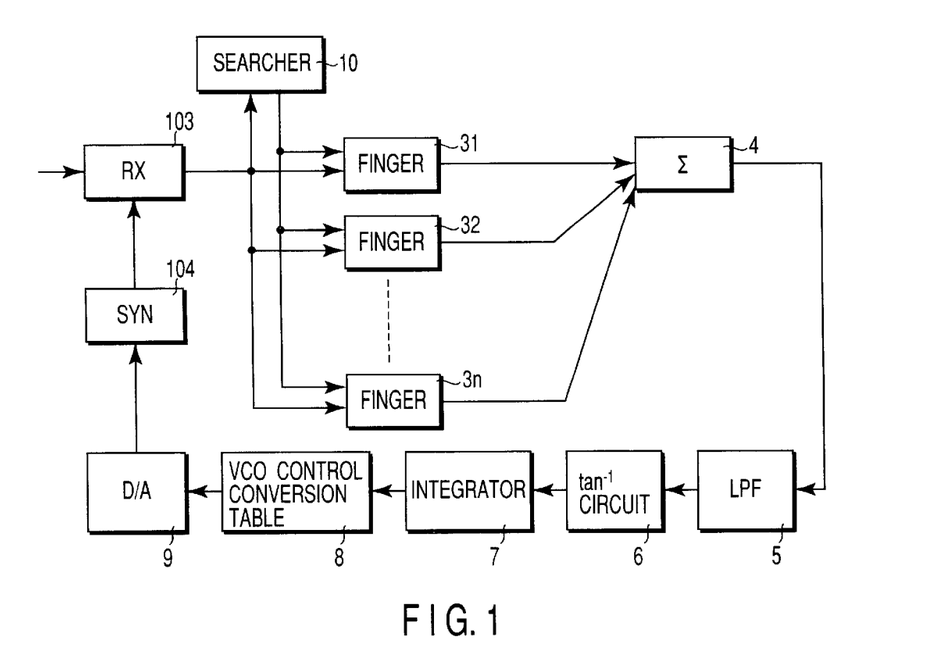
FIG. 1 shows a block diagram of a conventional automatic frequency control circuit.

A receiving system of a conventional mobile radio terminal device in a CDMA-type radio communication system is constituted as shown in FIG. 1.

A radio signal from a base station (not shown) is down-converted to a baseband signal by a receiving unit (RX) 103. The baseband signal is output to a searcher 10 and fingers 31 to 3n.

The searcher 10 detects number n of different passes suitable for reception by despreading the baseband signal at various timings. Then the searcher 10 assigns synchronous positions of slots and frames for reception of the respective passes to the fingers 31 to 3n as pass synchronization information.

Each of the fingers 31 to 3n generates a scramble code of the timing based on the pass synchronization information assigned by the searcher 10 and despreads the baseband signal by using the scramble code. Thus, n baseband signals despread by the fingers 31 to 3n are RAKE-synthesized.

Figure 2:
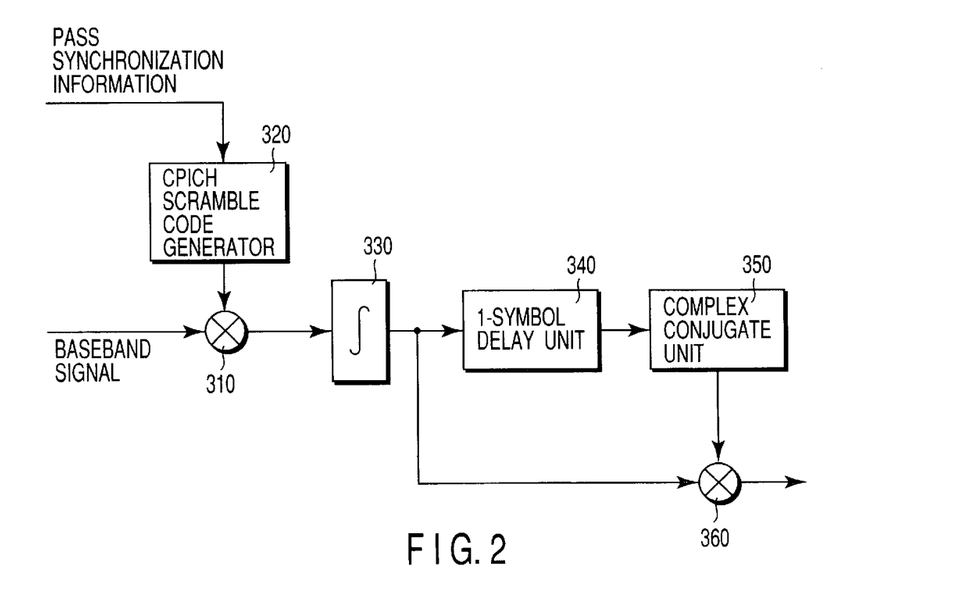
FIG. 2 shows a block diagram illustrating a finger of the conventional automatic frequency control circuit of FIG. 1.

The fingers 31 to 3n also have a function of detecting frequency errors $\Delta f1$ to $\Delta fn$ of the passes assigned to themselves, in the results of the despreading, and is constituted as shown in FIG. 2.

The baseband signal from the receiving unit 103 is input to a multiplier 310. The multiplier 310 multiplies the baseband signal by a scramble code generated by a CPICH scramble code generator 320. The CPICH scramble code generator 320 has generated the scramble code at a timing based on the pass synchronization information assigned by the searcher 10.

The result of multiplication of the multiplier 310 is integrated during a period equivalent to 1 symbol by an integrator 330. The result of the integration is output to a 1-symbol delay unit 340 and a multiplier 360.

The 1-symbol delay unit 340 delays the result of integration of the integrator 330 for a period equivalent to 1 symbol and outputs it to a complex conjugate unit 350.

The complex conjugate unit 350 inverts a code of a complex component in the result of integration which is input from the 1-symbol delay unit 340 and outputs the result of the inversion to the multiplier 360.

Figure 3:
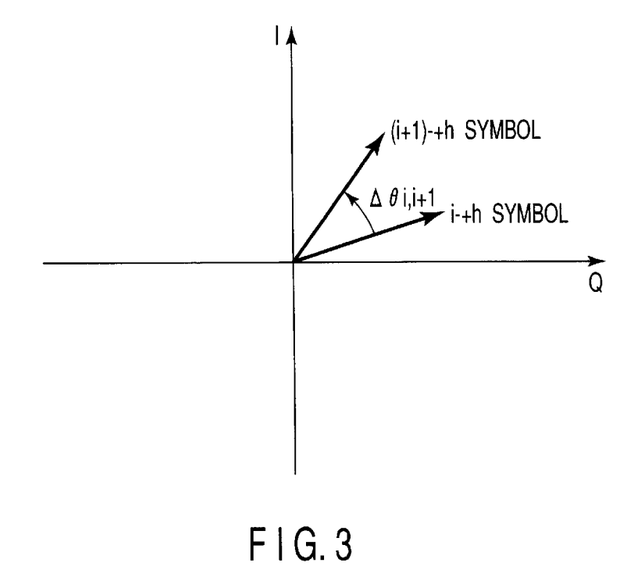
FIG. 3 shows the principle of detecting the phase difference between symbols.

The multiplier 360 obtains an amount of phase rotation in successive symbols, i.e. frequency errors ($\Delta f1$ to $\Delta fn$), as shown in FIG. 3 by multiplying the outputs of the integrator 330 and complex conjugate unit 350, which are shaped in a complex number.

The frequency errors $\Delta f1$ to $\Delta fn$ obtained by the respective fingers 31 to 3n in the above-mentioned manner are added in an adder ($\Sigma$) 4. The result of the addition is averaged by a low-pass filter (LPF) 5 and output to a $\tan^{-1}$ circuit 6 as the frequency error $\Delta f$.

The $\tan^{-1}$ circuit 6 obtains an arc tangent component of the frequency error $\Delta f$. The arc tangent component is integrated by an integrator 7 and output to a VCO control conversion table 8.

The VCO control conversion table 8 stores voltage values corresponding to various values that are input from the integrator 7 and outputs the information of voltage values corresponding to the output values of the integrator 7. The voltage value information that is output from the VCO control conversion table 8 is converted to a voltage signal corresponding to the information by a D/A converter (D/A) 9.

The voltage signal obtained in this manner is used as a control signal of a voltage control oscillator inside a synthesizer 104. Thus the oscillation frequency of the voltage control oscillator is controlled so that the output (frequency error $\Delta f$) of the low-pass filter 5 can be zero.

Incidentally, recently, transmission diversity has been conducted at the base station. The base station comprises two transmission antennas ANT1 and ANT2 for transmission to the mobile radio terminal apparatus, and the transmission diversity allows the phase between the signals transmitted from the antennas to be controlled at the base station so that the signals can be in a proper condition in the mobile radio terminal apparatus.

Figure 4:
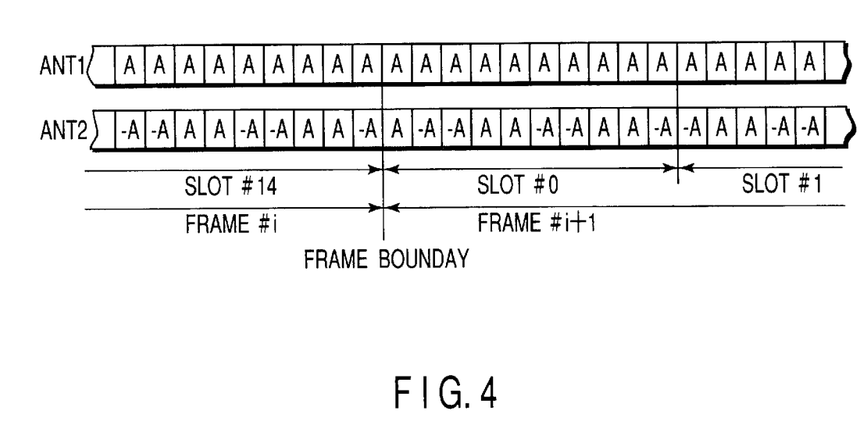
FIG. 4 shows a part of the symbol transmitted from each antenna when the base station executes the transmission diversity.

Symbols of patterns shown in FIG. 4 (hereinafter "AFC control symbols") are transmitted in a 15-frame cycle from the transmission antennas ANT1 and ANT2, for the automatic frequency control (AFC) in the mobile radio terminal apparatus. The symbol patterns of FIG. 4 are examples according to 3GPP (3rd Generation Partnership Project).

Figure 5:
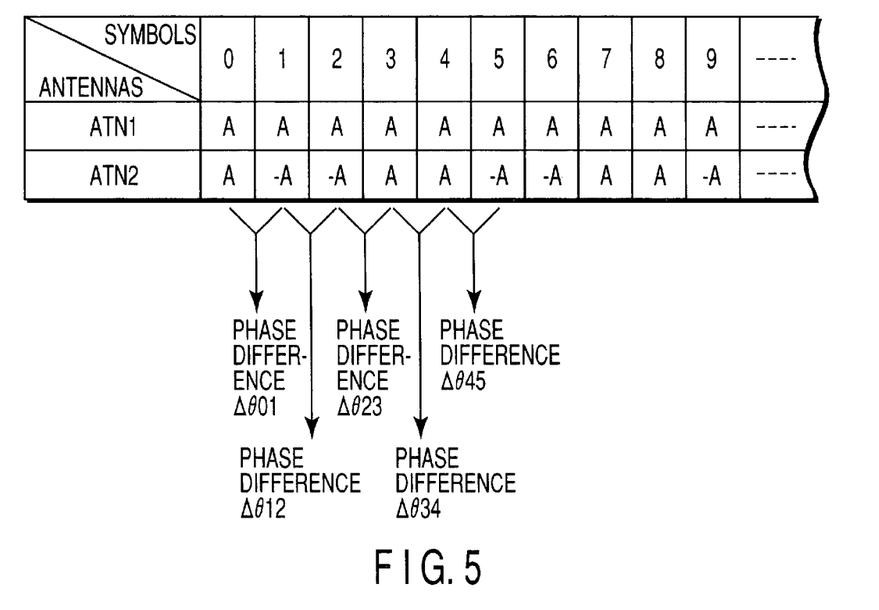
FIG. 5 shows combination of slots subjected to the detection of the phase difference executed by the finger shown in FIG. 2.

FIG. 5 shows parts of the patterns of the AFC control symbols. In the pattern of the symbols transmitted from the transmission antenna ANT 1, all the symbols are "A" (A=1+j). In the pattern of the symbols from the transmission antenna ANT 2, "A", "A", "–A" and "–A" are repeated. "–A" indicates –1–j.

Figure 6:
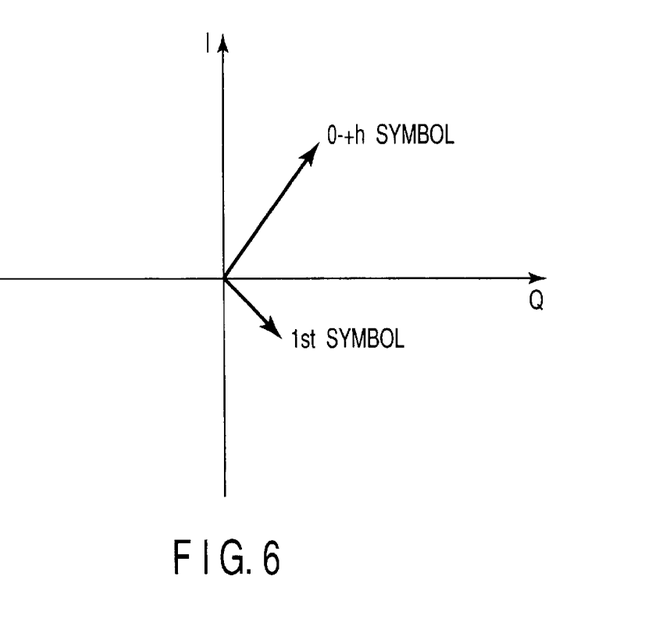
FIG. 6 shows that the phase difference cannot be detected by the finger shown in FIG. 2 to allow the base station to execute the transmission diversity.

If the transmission from the transmission antennas ANT1 and ANT2 to the mobile radio terminal apparatus is conducted at the same channel, a 0-th symbol as shown in FIG. 5 is "A" at both the transmission antennas ANT1 and ANT2 and thus becomes as shown in FIG. 6.

The first symbol in FIG. 5 is "A" at the transmission antenna ANT1 and "–A" at the transmission antenna ANT2. Therefore, the transmitted signal becomes a signal whose signal amplitude is almost zero as shown in FIG. 6.

For this reason, even if the conventional circuit as shown in FIG. 2 obtains the phase differences between symbols $\Delta\theta 01, \Delta\theta 12, \Delta\theta 23, \Delta\theta 34, \Delta\theta 45, \ldots$, in accordance with the signals transmitted from the base station which conducts the transmission diversity in order to obtain the frequency error $\Delta f$ from the phase differences, the circuit cannot detect the frequency error $\Delta f$ or normally execute the frequency-locking operation under the condition as shown in FIG. 6 or the condition that, particularly, the frequency error $\Delta f$ is great as seen when the power supply is turned on.

That is, if the communication partner executes the transmission diversity, the conventional automatic frequency control circuit cannot detect the frequency errors under the condition that, particularly, frequency error $\Delta f$ is great as seen when the power supply is turned on and, therefore, cannot normally execute the frequency-locking operation.

BRIEF SUMMARY OF THE INVENTION

The present invention aims to provide a mobile radio terminal and automatic frequency control circuit capable of executing a normal frequency-locking operation regardless of whether or not the communication partner executes the transmission diversity.

To achieve this object, there is provided a mobile radio terminal and automatic frequency control circuit comprising: symbol pattern storing means for storing patterns of symbols transmitted to allow a communication terminal to execute transmission diversity; synchronous information detecting means for detecting synchronous information of slots and frames of the signal received from the communication terminal, in the baseband signal; despreading means for despreading the baseband signal; integrating means for integrating a result of the despreading of the despreading means; integration controlling means for controlling the integrating means, to allow the integrating means to integrate the result of despreading of the despreading means corresponding to two successive predetermined periods in which combinations of the symbols are the same, in each of the predetermined periods, in accordance with the synchronous information detected by the synchronous information detecting means and the symbol patterns stored in the symbol pattern storing means; delay means for delaying an output of the integrating means; frequency error detecting means for detecting a frequency error of the local oscillation signal in accordance with a phase difference between a delay output of the delay means and an output of the integrating means; and frequency controlling means for controlling the frequency of the local oscillation signal in accordance with the frequency error detected by the frequency error detecting means.

In the above-constituted mobile radio terminal and automatic frequency control circuit, the integrating means is controlled to integrate the result of despreading of the despreading means corresponding to two successive predetermined periods in which combinations of the symbols are the same, in each of the predetermined periods, in accordance with the synchronous information detected by the synchronous information detecting means and the symbol patterns stored in the symbol pattern storing means. The frequency error of the local oscillation signal is detected in the phase difference between the output of the integrating means and the delayed output thereof to control the frequency of the local oscillation signal.

According to the mobile radio terminal and automatic frequency control circuit, even if the communication terminal transmits executes transmission from a plurality of transmission antennas to its own station by the transmission diversity, the reception signals are integrated in a period in which the combinations of the symbols transmitted from the respective transmission antennas are the same as one another and the frequency error is detected in accordance with the phase difference in the result of the integration. Accordingly, the frequency error can be exactly detected and the frequency-locking operation can be normally executed, regardless of whether or not the communication partner executes the transmission diversity.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiments of the present invention will be explained below with reference to the drawings.

Figure 7:
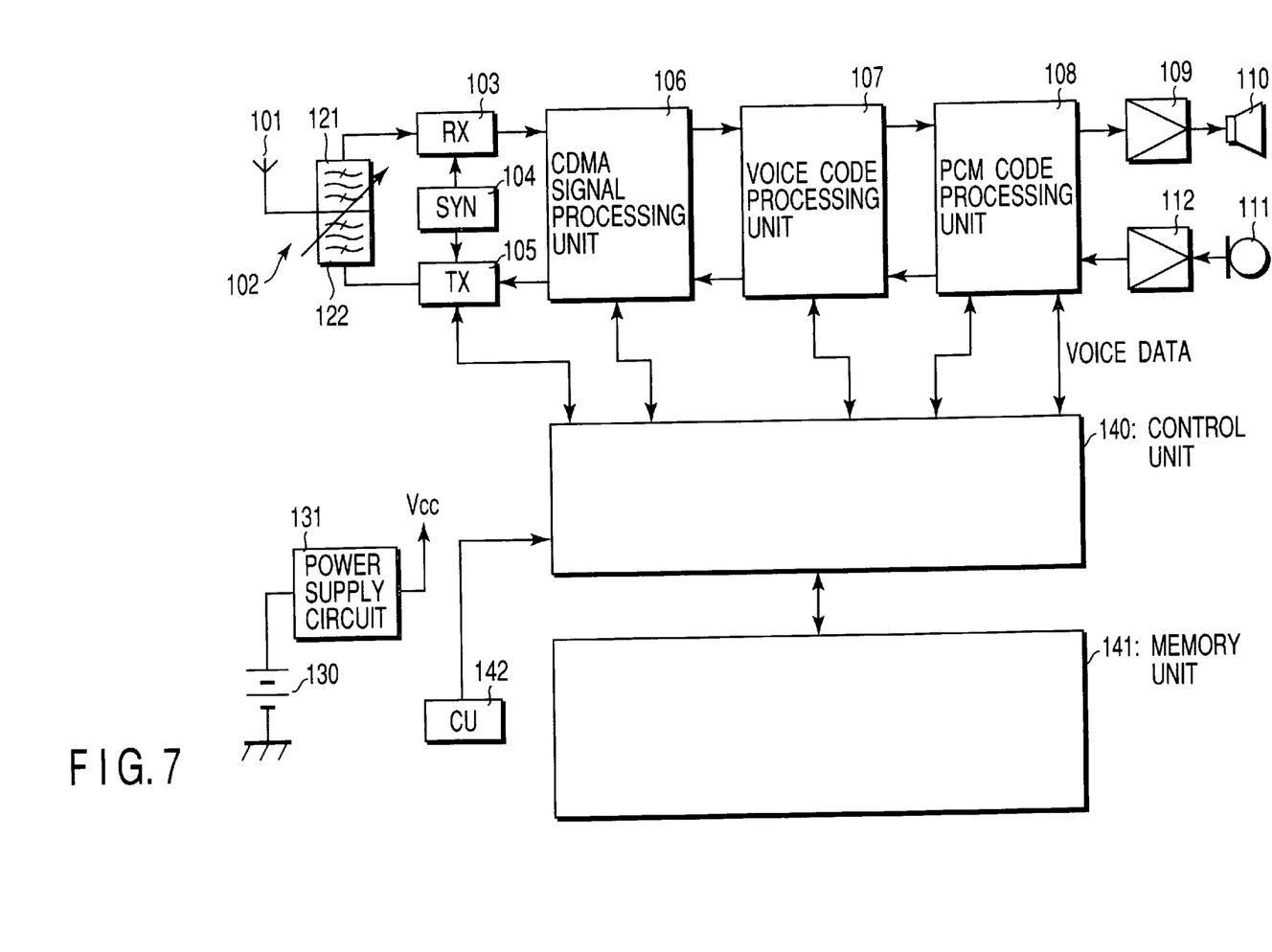
FIG. 7 shows a block diagram illustrating a mobile radio terminal according to the present invention.

FIG. 7 shows a structure of the mobile radio terminal according to the embodiment of the present invention.

An RF signal received by an antenna 101 is input to a duplexer 102. The duplexer 102 comprises a receiving filter 121 and a transmitting filter 122.

The RF signal in the band of signals transmitted from a base station (not shown), of the RF signals input from the antenna 101, is output to a receiving unit (RX) 103 through the receiving filter 121. This RF signal is not input to transmitting unit 105 to be described later by the transmitting filter 122. The receiving unit 103 mixes the RF signal with a receiving local oscillation signal which is input from a frequency synthesizer (SYN) 104 and frequency-converts the mixed signal to a baseband signal. The frequency of the receiving local oscillation signal generated by the frequency synthesizer 104 is controlled in accordance with a signal from a CDMA signal processing unit 106.

The baseband signal obtained in the receiving unit 103 is subjected to quadrature demodulation and despreading, and then converted to data of a determined format corresponding to a data rate, in the CDMA signal processing unit 106.

The result of the conversion is output to a voice code processing unit 107 as reception data. Data representing the data rate, of the reception data, is output to a control unit 140.

The voice code processing unit 107 decompresses the reception data obtained in the CDMA signal processing unit 106, in accordance with the reception data rate informed by the control unit 140, and outputs the result of the decompression to a PCM code processing unit 108.

The PCM code processing unit 108 decodes the reception data decompressed by the voice code processing unit 107 to obtain an analog reception signal. The analog reception signal is amplified by an amplifier 109 and then output from a loudspeaker 110.

On the other hand, the input voice of the speaker is input through a microphone 111 as an analog transmission signal. The analog transmission signal is amplified to a proper level by an amplifier 112, subjected to the PCM encoding by the PCM code processing unit 108, and output to the voice code processing unit 107 as transmission data.

The voice code processing unit 107 detects an amount of energy in the input voice in accordance with the transmission data which has been output from the PCM code processing unit 108, determines the data rate on the basis of the result of the detection, and informs the control unit 140 of the result. Then the voice code processing unit 107 compresses the transmission data to a burst signal of a format corresponding to the data rate and outputs the burst signal to the CDMA signal processing unit 106.

The CDMA signal processing unit 106 spreads the burst signal compressed by the voice code processing unit 107, by using a PN code corresponding to the transmission channel. The result of the spreading is subjected to the quadrature modulation and output to the transmitting unit (TX) 105 as a quadrature modulation signal.

The transmitting unit 105 synthesizes the quadrature modulation signal with the transmitting local oscillation signal and converts the synthesized signal to an RF signal. Then the transmitting unit 105 amplifies an only effective part of the RF signal in accordance with the transmission data rate informed by the control unit 140 and outputs the RF signal to the duplexer 102.

The signal in the transmission band, of the RF signals transmitted from the transmitting unit 105 to the duplexer 102, is output to the antenna 101 by the transmission filter 122 and is emitted into a space toward the base station. The RF signal in the transmission band is not input to the receiving unit 103 by the receiving filter 121.

Reference numeral 131 denotes a power supply circuit, which generates a predetermined operational power supply voltage Vcc on the basis of an output of a battery 130 and supplies the power to each circuit.

The control unit 140 has, for example, a microcomputer as a main control unit and controls each unit. The control contents include a general communication control function of establishing a communication link with a base station (not shown) and making communication therewith.

A memory unit 141 has a semiconductor memory such as ROM and RAM as its storage medium. The storage medium stores the control program and control data of the control unit 140, telephone book data in which names are associated with telephone numbers, and the like.

A console unit 142 comprises a key group including a dial key, a calling key, a power supply key, an end key, a volume control key, a mode select key and the like, an LCD display unit for indicating telephone numbers of communication partner terminals, the operation conditions of the apparatus and the like, and an LED lamp for indicating the Discharge condition of the battery 130 (or requesting the battery 130 to be charged).

Figure 8:
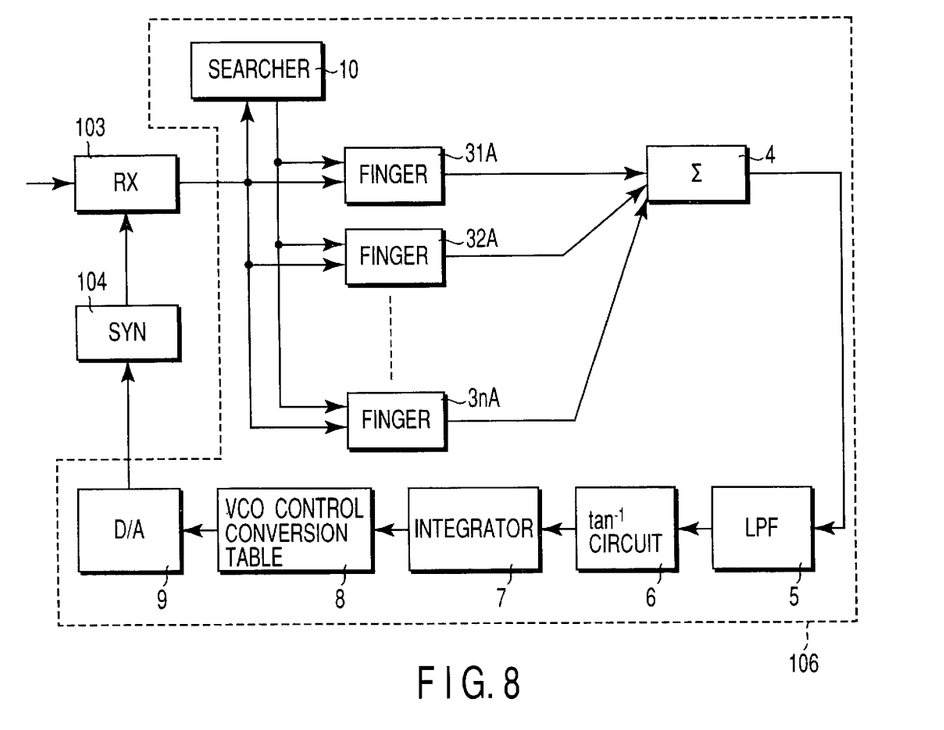
FIG. 8 shows a block diagram illustrating an automatic frequency control circuit according to a first embodiment of the present invention.

FIG. 8 shows an automatic frequency control circuit according to the first embodiment of the present invention. The figure illustrates the receiving unit 103, the frequency synthesizer 104 and the CDMA signal processing unit 106, and particularly the details of parts of the CDMA signal processing unit 106. The same portions as those of the conventional automatic frequency control circuit shown in FIG. 1 are denoted by the same reference numerals in FIG. 8.

The searcher 10 detects number n of different passes suitable for reception by despreading the baseband signal at various timings. Then the searcher 10 assigns synchronous positions of slots and frames for reception of the respective passes to fingers 31A to 3nA as pass synchronization information.

Each of the fingers 31A to 3nA generates a scramble code of the timing based on the pass synchronization information assigned by the searcher 10 and despreads the baseband signal by using the scramble code. Thus, n baseband signals despread by the fingers 31A to 3nA are RAKE-synthesized.

Figure 9:
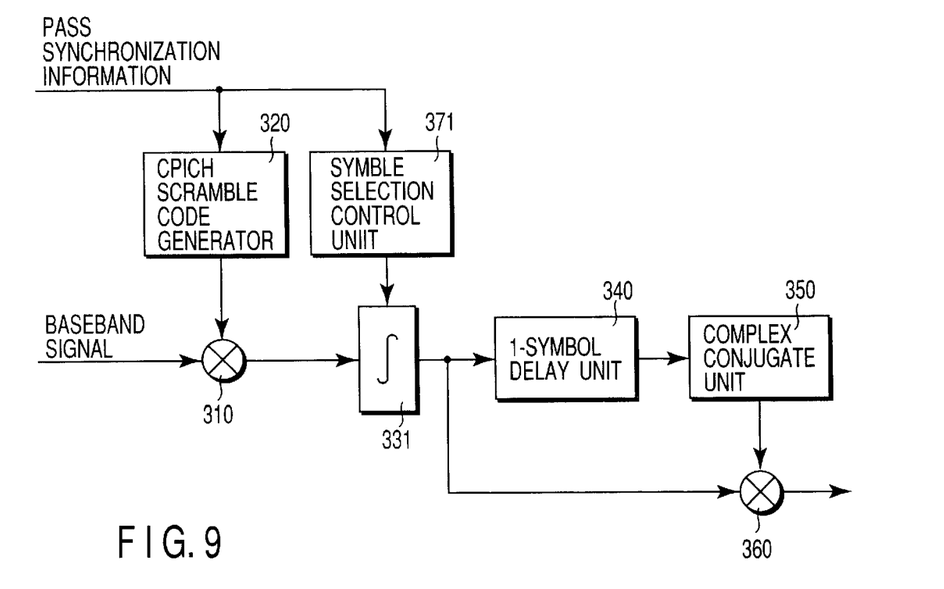
FIG. 9 shows a block diagram illustrating a finger of the automatic frequency control circuit shown in FIG. 8.

The fingers 31A to 3nA also have a function of detecting frequency errors $\Delta f1$ to $\Delta fn$ of the passes assigned to themselves, in the results of the despreading, and is constituted as shown in FIG. 9.

The multiplier 310 multiplies the baseband signal from the receiving unit 103 by the scramble code generated by the CPICH scramble code generator 320. The CPICH scramble code generator 320 has generated the scramble code at a timing based on the pass synchronization information assigned by the searcher 10.

An integrator 331 integrates the result of the multiplication of the multiplier 310, during a period equivalent to 1 symbol. The integration period and the output timing of the result of integration are controlled by a symbol selection control unit 371 to be described later. The result of the integration is output to the 1-symbol delay unit 340 and the multiplier 360.

The 1-symbol delay unit 340 delays the result of integration of the integrator 331 for a period equivalent to 1 symbol and outputs it to the complex conjugate unit 350.

The complex conjugate unit 350 inverts a code of a complex component in the result of integration which is input from the 1-symbol delay unit 340 and outputs the result of the inversion to the multiplier 360.

The multiplier 360 obtains an amount of phase rotation in successive symbols, i.e. frequency errors ($\Delta f1$ to $\Delta fn$), as shown in FIG. 3 by multiplying the outputs of the integrator 331 and complex conjugate unit 350, which are shaped in a complex number.

The symbol selection control unit 371 stores the AFC control symbol pattern based on 3GPP shown in FIG. 4, and detects which slot symbol of the AFC control symbol pattern is currently received from the base station, in accordance with the pass synchronization information from the searcher

10, i.e. the information about the synchronous positions of the slots and frames.

Figure 10:
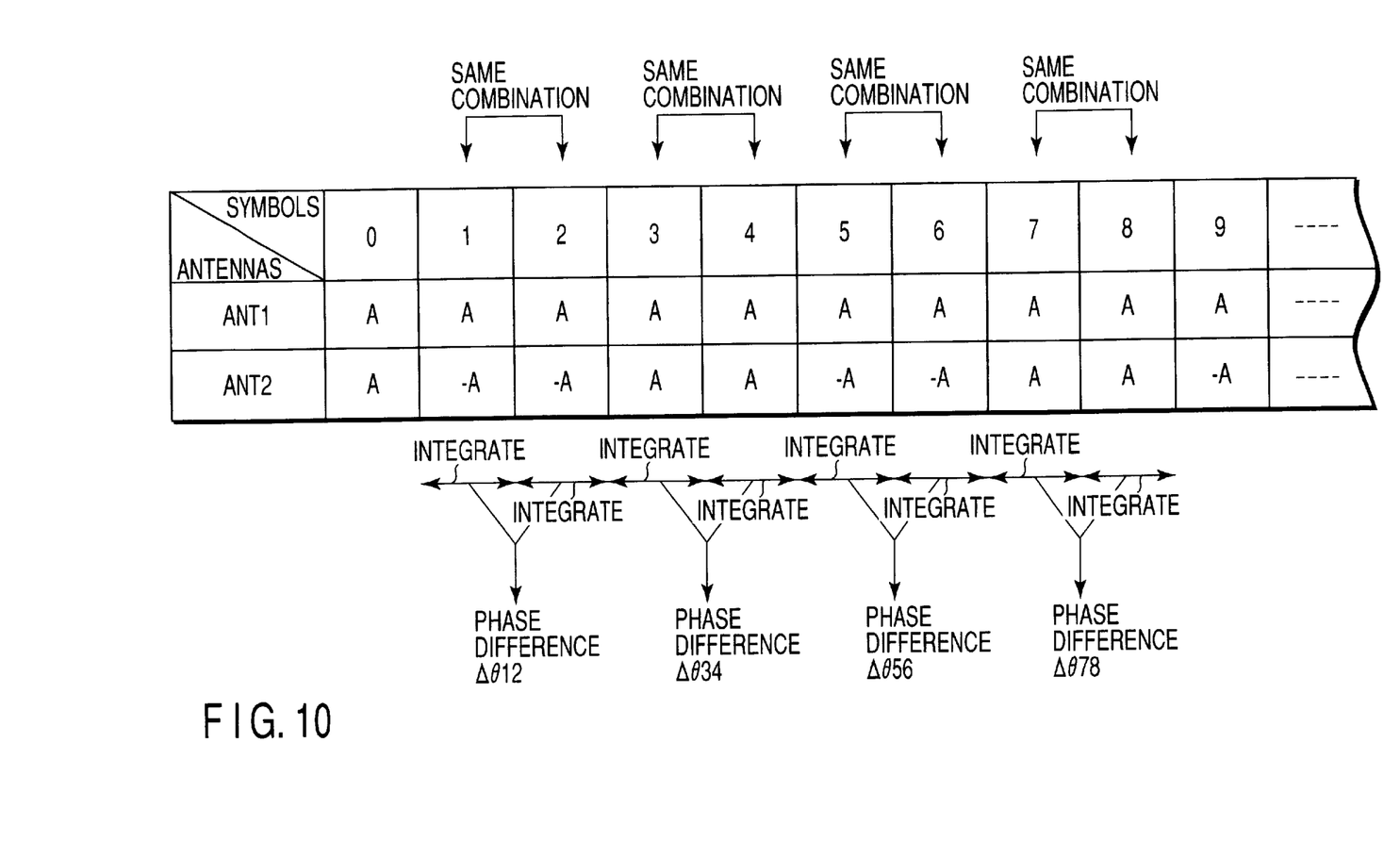
FIG. 10 shows combination of slots subjected to the detection of phase difference executed by the finger shown in FIG. 9.

Then the symbol selection control unit 371 controls the integration period and output timing of the integrator 331 so as to detect the phase difference between two successive slots in which combinations of the symbols transmitted from transmission antennas ANT1 and ANT2 of the base station are the same as one another as shown in FIG. 10, in accordance with the detected slot position information.

The adder (Σ) 4 adds the frequency errors Δf1 to Δfn obtained by the respective fingers 31A to 3nA. The low-pass filter (LPF) 5 averages the result of the addition of the adder 4 and outputs the result to the $\tan^{-1}$ circuit 6 as the frequency error Δf.

The $\tan^{-1}$ circuit 6 obtains an arc tangent component of the frequency error Δf. The arc tangent component is integrated by the integrator 7 and output to the VCO control conversion table 8.

The VCO control conversion table 8 stores voltage values corresponding to various values that are input from the integrator 7 and outputs the information of voltage values corresponding to the output values of the integrator 7. The voltage value information that is output from the VCO control conversion table 8 is converted to a voltage signal corresponding to the information by the D/A converter (D/A) 9.

The voltage signal obtained in this manner is used as a control signal of a voltage control oscillator inside a synthesizer 104. Thus the oscillation frequency of the frequency synthesizer 104 is controlled so that the output (frequency error Δf) of the low-pass filter 5 can be zero.

Next, detection of the frequency error Δf and control operations in the above-constituted automatic frequency control circuit will be explained.

The radio signal transmitted from the base station is received by the antenna 101, downconverted to a baseband signal by the receiving unit 103, and output to the searcher 10 and the fingers 31A to 3nA.

The searcher 10 despreads the baseband signal at various timings and detects n different passes suitable for reception. Then the searcher 10 assigns the synchronous positions of the slots and frames for reception of the respective passes to the fingers 31A to 3nA as the pass synchronization information.

The following operations are executed in the fingers 31A to 3nA.

The baseband signal from the receiving unit 103 is multiplied by the scramble code generated by the CPICH scramble code generator 320, in the multiplier 310.

The scramble code has been generated by the CPICH scramble code generator 320, at a timing based on the pass synchronization information assigned by the searcher 10.

The result of multiplication of the multiplier 310 is integrated by the integrator 331, under the control of the symbol selection control unit 371, during a period equivalent to one symbol. The result of integration is output from the integrator 331 to the 1-symbol delay unit 340 and the multiplier 360, in accordance with the instruction of the symbol selection control unit 371.

The symbol selection control unit 371 compares the pass synchronization information from the searcher 10, i.e. the information of the synchronous positions of the slots and frames, with the AFC control symbol pattern that the symbol selection control unit 371 itself stores, to detect which slot symbol from the base station it receives currently.

The symbol selection control unit 371 controls the integration period and output timing of the integrator 331 so as to detect the phase difference between the successive slots such that combinations of the symbols transmitted from transmission antennas ANT1 and ANT2 of the base station are the same as one another.

For example, in FIG. 10, the first symbol combination is the same as the second symbol combination. Thus, the symbol selection control unit 371 controls the integration period and output timing of the integrator 331 so as to obtain a phase difference $\Delta\theta_{12}$ between these symbols.

In addition, the third symbol combination is the same as the fourth symbol combination. Thus, the symbol selection control unit 371 controls the integration period and output timing of the integrator 331 so as to obtain a phase difference $\Delta\theta_{34}$ between these symbols. After that, the symbol selection control unit 371 repeats this control.

The amounts of phase rotation $\Delta\theta_{12}$, $\Delta\theta_{34}$, $\Delta\theta_{56}$, $\Delta\theta_{78}$, ..., obtained by the multipliers 360 in the respective fingers 31A to 3nA under this control, are input to the adder 4 as the frequency errors (Δf1 to Δfn) and added to the frequency errors (Δf1 to Δfn) obtained in the other fingers 31A to 3nA.

The result of the addition is averaged by the low-pass filter 5, output to the $\tan^{-1}$ circuit 6 as the frequency error Δf. Then the arc tangent component of the frequency error Δf is obtained in the $\tan^{-1}$ circuit 6.

The arc tangent component is integrated by the integrator 7 and output to the VCO control conversion table 8.

The VCO control conversion table 8 outputs the information of voltage values corresponding to the result of integration of the integrator 7. The voltage value information that is output from the VCO control conversion table 8 is converted to a voltage signal corresponding to the information by the D/A converter (D/A) 9.

The voltage signal obtained in this manner is used as a control signal of the frequency synthesizer 104. Thus the oscillation frequency of the voltage control oscillator is controlled so that the output (frequency error Δf) of the low-pass filter 5 can be zero.

As described above, in the above-constituted automatic frequency control circuit, the phase difference between two successive slots in which combinations of the symbols transmitted from transmission antennas ANT1 and ANT2 of the base station are the same as one another, is detected in accordance with the information of the synchronous positions of the slots and frames.

That is, in the above-constituted automatic frequency control circuit, the phase difference Δθ between two slots having the same amplitude is detected and the frequency error Δf based thereon is reduced.

Accordingly, the above-constituted automatic frequency control circuit can execute the normal frequency-locking operation regardless of whether or not the base station executes the transmission diversity, even under the condition that the frequency error is great as seen when the power supply is turned on.

Figure 11:
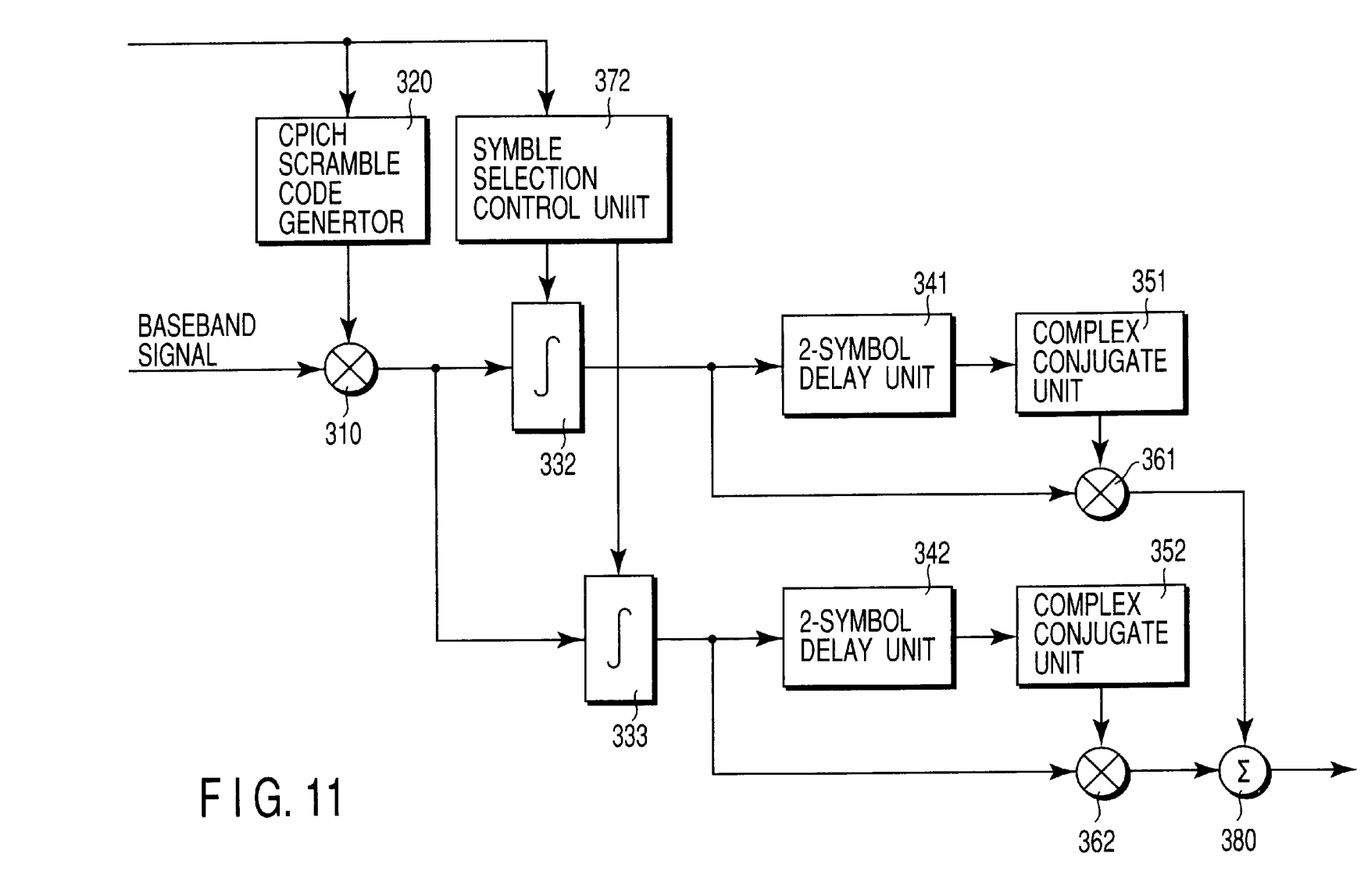
FIG. 11 shows a block diagram illustrating a finger according to a second embodiment of the present invention.

Next, the automatic frequency control circuit according to the second embodiment of the present invention will be described. The circuit of the second embodiment has the same constitution as that of the circuit shown in FIG. 1, but is different therefrom with respect to the point that the fingers 31A to 3nA are constituted as shown in FIG. 11. The second embodiment will be explained with reference to FIG. 11.

The multiplier 310 multiplies the baseband signal from the receiving unit 103 by the scramble code generated by the CPICH scramble code generator 320. The CPICH scramble code generator 320 has generated the scramble code at the timing based on the pass synchronization information assigned from the searcher 10.

An integrator 332 integrates the result of integration of the multiplier 310 during a period equivalent to two symbols. The integration period and the output timing of the result of integration are controlled by a symbol selection control unit 372 to be described later. The result of the integration is output to a 2-symbol delay unit 341 and a multiplier 361.

Similarly, an integrator 333 integrates the result of integration of the multiplier 310 during a period equivalent to two symbols. The integration period and the output timing of the result of integration are controlled by the symbol selection control unit 372 to be described later. The result of the integration is output to a 2-symbol delay unit 342 and a multiplier 362.

The 2-symbol delay unit 341 delays the result of integration of the integrator 332 during a period equivalent to two symbols and outputs the result to a complex conjugate unit 351.

The complex conjugate unit 351 inverts the code of the complex component in the result of integration that is input from the 2-symbol delay unit 341 and outputs the result of inversion to the multiplier 361.

The multiplier 361 obtains the amount of phase rotation between successive symbols, i.e. the frequency error by multiplying the outputs of the integrator 332 and complex conjugate unit 351, which are shaped in a complex number.

Similarly, the 2-symbol delay unit 342 delays the result of integration of the integrator 333 during a period equivalent to two symbols and outputs the result to a complex conjugate unit 352.

The complex conjugate unit 352 inverts the code of the complex component in the result of integration that is input from the 2-symbol delay unit 342 and outputs the result of inversion to the multiplier 362.

The multiplier 362 obtains the amount of phase rotation between successive symbols, i.e. the frequency error by multiplying the outputs of the integrator 333 and complex conjugate unit 352, which are shaped in a complex number.

An adder ($\Sigma$) 380 adds the frequency errors obtained by the multipliers 361 and 362. The frequency error thus obtained is output to the adder 4 as the frequency error $\Delta f$.

The symbol selection control unit 372, which stores the AFC control symbol pattern based on 3GPP shown in FIG. 4, detects which slot symbol of the AFC control symbol pattern is currently received from the base station, in accordance with the pass synchronization information from the searcher 10, i.e. the information of the synchronous positions of the slots and frames.

Figure 12:
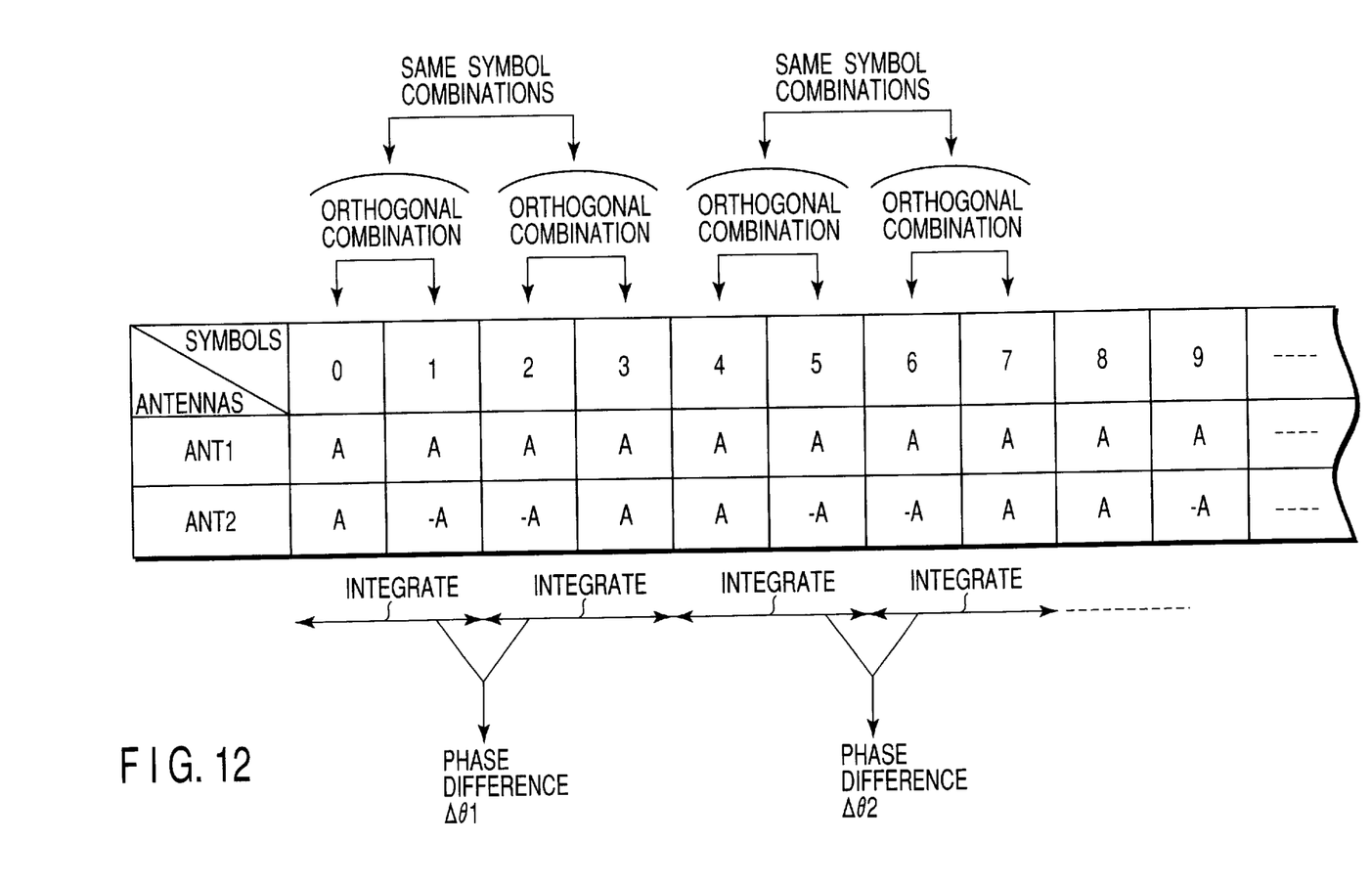
FIG. 12 shows combination of slots subjected to the detection of phase difference executed by the finger shown in FIG. 11.

Then the symbol selection control unit 372 controls the integrators 332 and 333, such that the integrators integrate and output two successive slots in which the combinations of the symbols transmitted from the transmission antennas ANT1 and ANT2 of the base station are orthogonal, as shown in FIG. 12, in accordance with the detected slot position information.

Next, the operations of detecting the frequency errors $\Delta f1$ to $\Delta fn$ by the above-constituted fingers 31A to 3nA will be explained.

The baseband signal from the receiving unit 103 is multiplied by the scramble code generated by the CPICH scramble code generator 320, in the multiplier 310.

The CPICH scramble code generator 320 has generated the scramble code at a timing based on the pass synchronization information assigned by the searcher 10.

The result of multiplication of the multiplier 310 is integrated by the integrators 332 and 333, under the control of the symbol selection control unit 372, during a period equivalent to two symbols. The result of integration is output in accordance with the instructions of the symbol selection control unit 372.

The symbol selection control unit 372 compares the pass synchronization information from the searcher 10, i.e. the information of the synchronous positions of slots and frames with the AFC control symbol pattern that the control unit itself stores, and detects which slot symbol is received from the base station.

The symbol selection control unit 372 controls the integrators 332 and 333, such that the integrators integrate and output two successive slots in which the combinations of the symbols transmitted from the transmission antennas ANT1 and ANT2 of the base station are orthogonal, in accordance with the detected slot position information.

That is, the symbol selection control unit 372 controls the integrator 332 such that, for example, the integrator outputs the result of integrating the 0-th and first symbols, which are orthogonal symbol combinations, as shown in FIG. 12, and the result of integrating the second and third symbols, which are also orthogonal symbol combinations.

The symbol selection control unit 372 also controls the integrator 333 such that the integrator outputs the result of integrating the fourth and fifth symbols, which are orthogonal symbol combinations and the result of integrating the sixth and seventh symbols, which are also orthogonal symbol combinations, as shown in FIG. 12.

This control allows the integrator 361 to obtain the phase difference $\Delta\theta1$ between the result of integration of the 0th and first symbols and the result of integration of the second and third symbols, and also allows the integrator 362 to obtain the phase difference $\Delta\theta2$ between the result of integration of the fourth and fifth symbols and the result of integration of the sixth and seventh symbols.

The phase differences $\Delta\theta1$ and $\Delta\theta2$ are added by the adder 380. The result of addition is input to the adder 4 as the frequency error ($\Delta f1$ to $\Delta fn$). In the adder 4, this frequency error and the frequency error ($\Delta f1$ to $\Delta fn$) obtained by the other fingers 31A to 3nA are added.

As described above, the fingers 31A to 3nA shown in FIG. 11 integrate two successive symbols such that the combinations of the symbols transmitted from the transmission antennas ANT1 and ANT2 of the base station are orthogonal, and obtains the phase difference $\Delta\theta$ in the result of integration, in accordance with the information of the synchronous positions of the slots and frames, and then detects the frequency error $\Delta f$ on the basis of the phase difference.

Therefore, according to the above-constituted automatic frequency control circuit, since the frequency error can be detected while noticing the orthogonality of the symbol pattern in a case where the frequency error to the base station is 0.5 ppm or smaller, it is possible to follow up the frequency at high accuracy and thereby enhance the communication quality.

The present invention is not limited to the above-described embodiments. In the second embodiment, for example, the phase difference of every two symbols is obtained. However, the accuracy in detection of the frequency error can be further enhanced by obtaining the phase difference of two or more symbols.

The second embodiment is based on the fact that the base station executes the transmission diversity. If the base station does not execute the transmission diversity, consumption power can be saved by detecting the frequency error in one system similarly to the prior art.

In the above descriptions, the first and second embodiments have been explained as separate automatic frequency control circuits. However, both the automatic frequency control circuits of the two embodiments can be applied to one receiving circuit.

Thus, in a case where the automatic frequency control circuits of the two embodiments are applied to one receiving circuit, if the frequency error is great as seen when the power supply is turned on, the automatic frequency control circuit of the first embodiment is operated.

When the frequency error becomes smaller, the normal frequency-locking operation can be executed and the accuracy in detection of the frequency error can be enhanced by operating the automatic frequency control circuit of the second embodiment, regardless of whether or not the communication partner executes the transmission diversity.

It is needless to say that the present invention can be variously modified within a range that does not exceed the gist of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile radio terminal having a function of controlling a frequency of a local oscillation signal used to frequency-convert a spread spectrum communication type radio signal to be received into a baseband signal, said terminal comprising:

symbol pattern storing means for storing patterns of symbols transmitted to allow a communication terminal to execute transmission diversity;

synchronous information detecting means for detecting synchronous information of slots and frames of the signal received from said communication terminal, in said baseband signal;

despreading means for despreading said baseband signal;

integrating means for integrating a result of the despreading of the despreading means;

integration controlling means for controlling said integrating means, to allow said integrating means to integrate the result of despreading of said despreading means corresponding to two successive predetermined periods in which combinations of the symbols are the same, in each of said predetermined periods, in accordance with the synchronous information detected by said synchronous information detecting means and the symbol patterns stored in the symbol pattern storing means;

delay means for delaying an output of said integrating means;

frequency error detecting means for detecting a frequency error of said local oscillation signal in accordance with a phase difference between a delay output of said delay means and an output of said integrating means; and frequency controlling means for controlling the frequency of said local oscillation signal in accordance with the frequency error detected by said frequency error detecting means.

2. A mobile radio terminal according to claim 1, wherein said integration controlling means controls said integrating means, to allow said integrating means to integrate the result of despreading of said despreading means corresponding to two successive symbols in which combinations of the symbols are the same, for each of the symbols, in accordance with the synchronous information detected by said synchronous information detecting means and the symbol patterns stored in the symbol pattern storing means.

3. A mobile radio terminal according to claim 1, wherein said integration controlling means controls said integrating means, to allow said integrating means to integrate the result of despreading of said despreading means corresponding to two successive predetermined periods in which combinations of the symbols are the same, in each of the periods, in accordance with the synchronous information detected by said synchronous information detecting means and the symbol patterns stored in the symbol pattern storing means, and said symbol combinations are combinations of symbol patterns orthogonal to one another.

4. A mobile radio terminal according to claim 1, wherein if the frequency error is equal to or greater than a preset value, said integration controlling means controls said integrating means, to allow said integrating means to integrate the result of despreading of said despreading means corresponding to two successive symbols in which combinations of the symbols are the same, for each of the symbols, in accordance with the synchronous information detected by said synchronous information detecting means and the symbol patterns stored in the symbol pattern storing means; and if the frequency error is smaller than a preset value, said integration controlling means controls said integrating means, to allow said integrating means to integrate the result of despreading of said despreading means corresponding to two successive predetermined periods in which combinations of the symbols are the same, in each of the periods, in accordance with the synchronous information detected by said synchronous information detecting means and the symbol patterns stored in the symbol pattern storing means, and said symbol combinations of two slots in said periods are combinations of symbol patterns orthogonal to one another.

5. An automatic frequency control circuit for controlling a frequency of a local oscillation signal used to frequency-convert a spread spectrum communication type radio signal to be received into a baseband signal, said circuit comprising:

symbol pattern storing means for storing patterns of symbols transmitted to allow a communication terminal to execute transmission diversity;

synchronous information detecting means for detecting synchronous information of slots and frames of the signal received from said communication terminal, in said baseband signal;

despreading means for despreading said baseband signal;

integrating means for integrating a result of the despreading of the despreading means;

integration controlling means for controlling said integrating means, to allow said integrating means to integrate the result of despreading of said despreading means corresponding to two successive predetermined periods in which combinations of the symbols are the same, in each of said predetermined periods, in accordance with the synchronous information detected by said synchronous information detecting means and the symbol patterns stored in the symbol pattern storing means;

delay means for delaying an output of said integrating means;

frequency error detecting means for detecting a frequency error of said local oscillation signal in accordance with a phase difference between a delay output of said delay means and an output of said integrating means; and frequency controlling means for controlling the frequency of said local oscillation signal in accordance with the frequency error detected by said frequency error detecting means.

6. An automatic frequency control circuit according to claim 5, wherein said integration controlling means controls said integrating means, to allow said integrating means to integrate the result of despreading of said despreading means corresponding to two successive symbols in which combinations of the symbols are the same, for each of the symbols, in accordance with the synchronous information detected by said synchronous information detecting means and the symbol patterns stored in the symbol pattern storing means.

7. An automatic frequency control circuit according to claim 5, wherein said integration controlling means controls said integrating means, to allow said integrating means to integrate the result of despreading of said despreading means corresponding to two successive predetermined periods in which combinations of the symbols are the same, in each of the periods, in accordance with the synchronous information detected by said synchronous information detecting means and the symbol patterns stored in the symbol pattern storing means, and said symbol combinations are combinations of symbol patterns orthogonal to one another.

8. An automatic frequency control circuit according to claim 5, wherein if the frequency error is equal to or greater than a preset value, said integration controlling means controls said integrating means, to allow said integrating means to integrate the result of despreading of said despreading means corresponding to two successive symbols in which combinations of the symbols are the same, for each of the symbols, in accordance with the synchronous information detected by said synchronous information detecting means and the symbol patterns stored in the symbol pattern storing means; and if the frequency error is smaller than a preset value, said integration controlling means controls said integrating means, to allow said integrating means to integrate the result of despreading of said despreading means corresponding to two successive predetermined periods in which combinations of the symbols are the same, in each of the periods, in accordance with the synchronous information detected by said synchronous information detecting means and the symbol patterns stored in the symbol pattern storing means, and said symbol combinations of two slots in said periods are combinations of symbol patterns orthogonal to one another.

* * * * *